R. O'NEILL.
FLOATING DRY DOCK.
APPLICATION FILED AUG. 28, 1915.
1,181,030.
Patented Apr. 25, 1916.
2 SHEETS—SHEET 1.
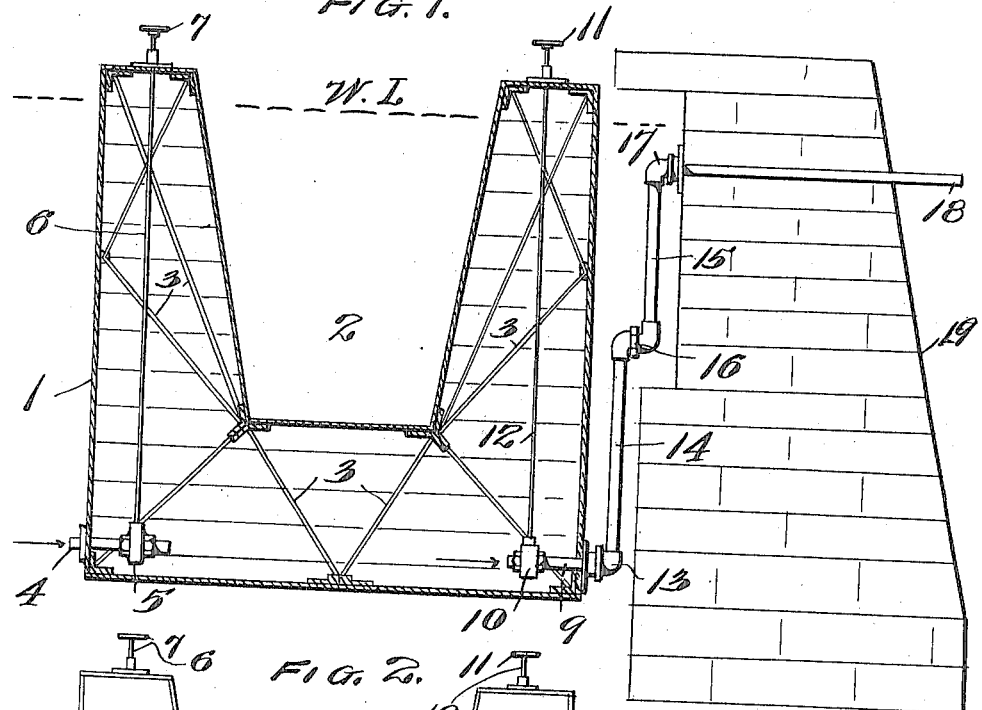
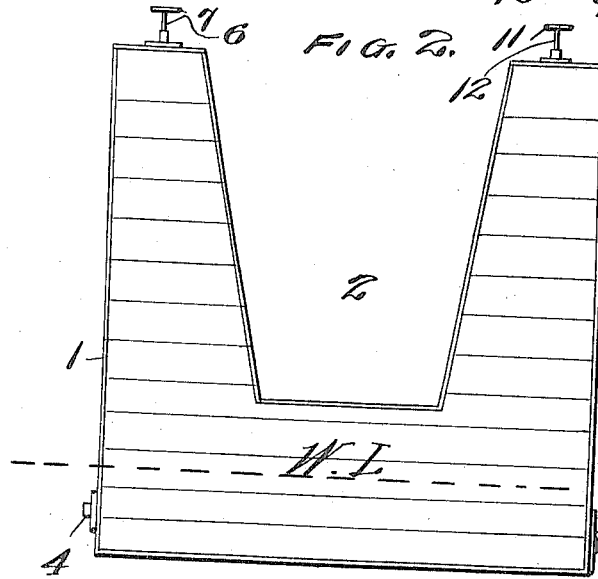
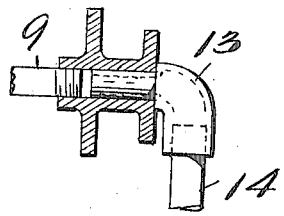
FIG. 4.
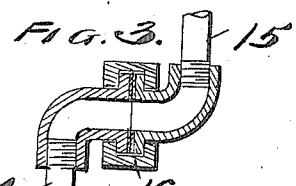
FIG. 3.
Witness
C. K. Davis
Inventor
ROBERT O'NEILL
By Herman A. Phillips
Attorney
THE COLUMBIA PLANOGRAPH CO., WASHINGTON, D. C.

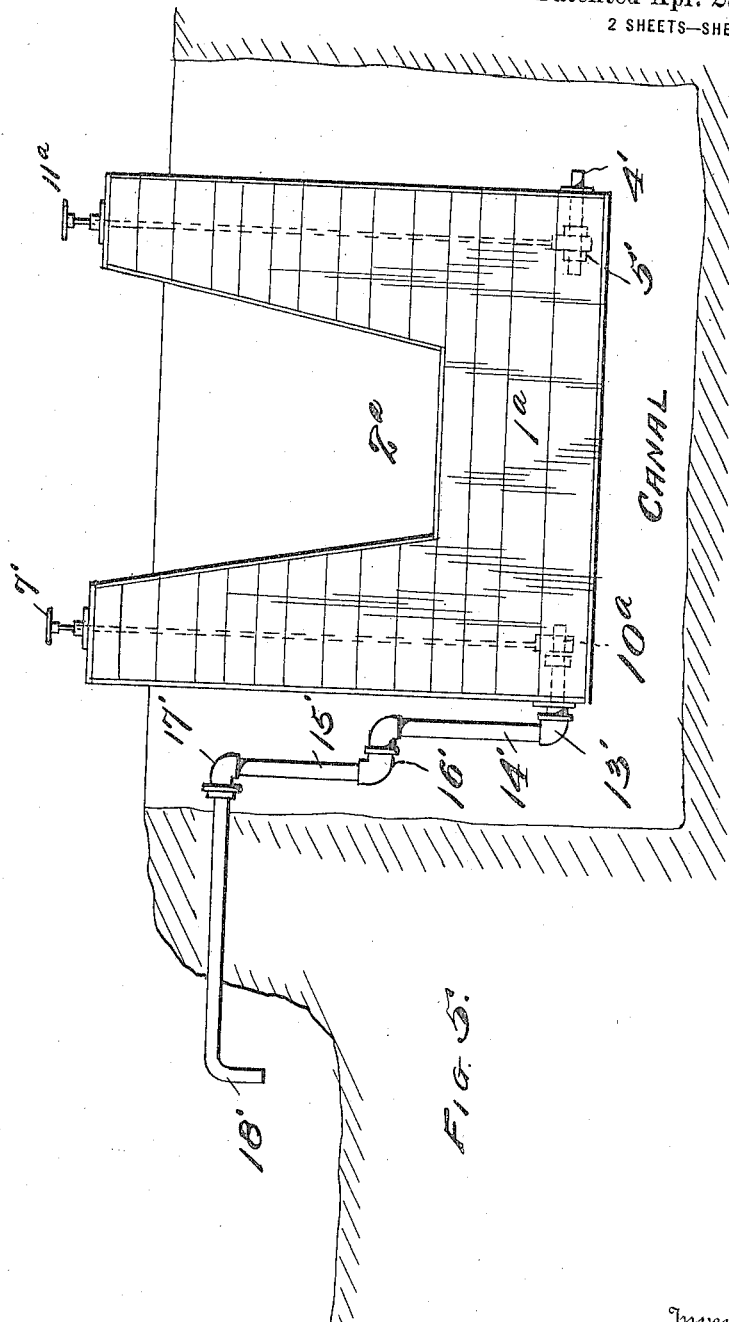

UNITED STATES PATENT OFFICE.

ROBERT O'NEILL, OF BUFFALO, NEW YORK.

FLOATING DRY-DOCK.

1,181,030.

Specification of Letters Patent.  Patented Apr. 25, 1916.

Application filed August 28, 1915. Serial No. 47,835.

*To all whom it may concern:*

Be it known that I, ROBERT O'NEILL, a citizen of the United States of America, residing at Buffalo, in the county of Erie and State of New York, have invented certain new and useful Improvements in Floating Dry-Docks, of which the following is a specification.

The present invention relates to improvements in floating dry docks and is designed to provide a buoyant dry dock which is automatically operated by the rising and falling of the water line due to the movement of the tides.

The invention consists in certain novel combinations and arrangements of parts whereby advantage is taken of the movement of the water as the tide rises and falls, in order that the dry dock itself may be raised or lowered, as will be hereinafter more fully pointed out and claimed.

In the operation of the dry dock, I employ siphonic action for emptying the dry dock, and this action is brought about by the rise of the tide.

In the accompanying drawings I have illustrated in conventionalized form, one complete example of the physical embodiment of my invention, constructed according to the best mode I have so far devised for the practical application of the principles of my invention. In the drawings I have exemplified the invention, but have not set forth the minor details of construction, it being understood that the drawings are intended to illustrate the principles of the physical embodiment of the invention, and the details of construction and operation will be worked out on a larger scale.

Figure 1 is a sectional view of the dry dock, showing it in position to receive a vessel. Fig. 2 is an end view of the dry dock, showing it in raised or lifted position, and floating above the surface of the water. Fig. 3 is a detail sectional view of a swiveled coupling for the outlet pipe. Fig. 4 is a sectional detail view of another form of swiveled joint. Fig. 5 is another view illustrating another use of the floating dry dock.

In the drawings which exemplify my invention, the floating dry dock is illustrated as a hollow vessel 1, provided with an opening or cradle 2 for the reception of a vessel to be docked. The floating dry dock is of course buoyant, and may be made up of numerous compartments for air and water, or a single space may be utilized for water and air if desired. The floating dry dock is illustrated as a shell having braces 3, 3, etc., to hold its walls in position, but I have only indicated in conventional form the manner of bracing the walls, it being understood that the laws of marine architecture will be followed in producing the buoyant or floating dry dock.

The dry dock is provided with a water inlet pipe 4 controlled by the valve 5 through its stem 6, which extends vertically up through the dock or shell and is provided with a hand wheel 7, accessible from the deck of the vessel. An outlet pipe 9 is equipped with a valve 10, which is also controlled from the deck of the vessel 1 by the hand-wheel 11 and stem 12. The outlet pipe 9 extends through the wall of the vessel and a swivel joint 13 outside the vessel wall connects said outlet pipe with a siphon section 14. This pipe or section 14 is connected to a similar pipe 15 by a swivel or universal joint 16, and by the swivel joint 17 this section 15 is connected to the discharge pipe 18, which passes through the wall 19. The water line in both figures is indicated by the letters W, L.

The operation of the dry dock is as follows: The floating dry dock is filled with water through the intake 4, with the valve 5 open and the valve 10 closed, until the dock sinks to the required depth, and the boat to be docked is floated into the cradle 2 and secured therein. The dock is sunk at low tide, then as the tide rises, the floating dock rises with the tide, say 6 feet, and the swivel joints 13, 16, 17, permit the discharge pipes or sections 14, 15, to swing upon these joints as pivots, creating a siphon of the pipes 14, 15, and the water is siphoned from the interior of the dry dock and discharged through the pipe 18. The siphon action of course continues after the tide reaches its flood, and the result is that the dry dock rises out of the water, lifting the docked vessel with it. If the tide rises, say 6 feet, I am enabled to lift the floating dock approximately 30 feet, and in this manner boats or vessels drawing considerable water may be lifted by means of the floating dry dock, as desired. When the dry dock is to be lowered, of course the water is permitted to flow in through the intake pipe 4, and controlled by the valve 5. The entire apparatus is controlled and regulated by using the valves 5 and 6, and while I have illustrated only one of each of these valves, it will be understood that more valves may be used if desired, and additional siphons may be employed to quickly empty the floating dry dock. These and other features of the invention will be elaborated, and it will be understood that I have shown only sufficient of the construction and operation of my invention to enable any one skilled in the art to make and use the same.

In the utilization of the invention in Fig. 5, I have depicted a floating dry dock to be used in quiet waters as, for instance, in a canal where the tide does not rise and fall. The dry dock proper as 1ª has the cradle 2ª, the water inlet pipe 4' and valve 5', controlled by the hand wheel 11ª. The outlet valve 10ª is controlled by the hand wheel 7', and the water passes through the swivel joint 13', pipe section 14', swivel joint 16', pipe section 15', swivel joint 17' to the outlet pipe 18', which will carry the water to a river bed or low land, as shown. The outlet pipe 18' must be located a sufficient distance below the upper surface or deck portion of the floating dry dock, in order that the siphon may be effective, and it is also located below the surface of the walls of the canal. Thus, when the dry dock is to be sunk, the water is permitted to enter the vessel through pipe 4' and valve 5' until the surface of the water in the vessel reaches a point considerably above the pipe 18'. With the water level in the vessel at its highest point, the valve 5' is closed, and the valve 10ª is opened so that the water will flow through the outlet pipe 18', creating a siphon. This siphonic action continues until the specific gravity of the dry dock is equalized with relation to the water in the canal, and the rising of the dry dock of course lifts any vessel or object that is contained in the cradle 2ª. The bouyancy of the dry dock is determined, and its rise is governed by the arrangement of the outlet pipes, the depth of the canal, and the distance between the outlet pipe 18' and the valve 10ª.

What I claim is:

1. The combination with a hollow floating dry dock having an intake pipe and a controlling valve therefor, of a discharge pipe, an outlet pipe from the dry dock and swiveled pipe sections between said outlet pipe and the discharge pipe adapted to form a siphon.

2. The combination with a hollow floating dry dock having an intake pipe and controlling valve therefor, of a fixed discharge pipe, an outlet pipe and a controlling valve, a swivel joint on the outlet pipe, a swivel joint on the discharge pipe, and an intermediate swiveled joint connected to said first mentioned swiveled joints by pipe sections, whereby when the dry dock is lifted by the rising tide, a siphon is created by the swiveled pipe sections to discharge water from the interior of the dry dock.

I testimony whereof I affix my signature.

ROBERT O'NEILL.